(12) United States Patent
Rubin et al.

(10) Patent No.: US 6,567,815 B1
(45) Date of Patent: May 20, 2003

(54) TECHNIQUE OF CLUSTERING AND COMPACTION OF BINARY TREES

(75) Inventors: Shai Rubin, Madison, WI (US); Ayal Zaks, Mitzpe Aviv (IL)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 09/629,659

(22) Filed: Aug. 1, 2000

(51) Int. Cl.$^7$ .............................................. G06F 17/30
(52) U.S. Cl. .......................................... 707/101; 707/2
(58) Field of Search ........................... 707/1, 2, 3, 100, 707/101

(56) References Cited

U.S. PATENT DOCUMENTS

| | | | | |
|---|---|---|---|---|
| 5,530,957 A | * | 6/1996 | Koenig ........................ | 707/100 |
| 5,848,416 A | * | 12/1998 | Tikkanen ..................... | 707/101 |
| 6,029,170 A | * | 2/2000 | Garger et al. .................. | 707/1 |
| 6,415,279 B1 | * | 7/2002 | Gard et al. .................. | 704/222 |

OTHER PUBLICATIONS

Microsoft Press Computer Dictionary Second Edition, 1994, Microsoft Press, PP. 60 and 286.*
"The Influence of Caches on the Performance of Heaps", Lamarca Anthony, and Landner Richard E. The ACM Journal of Experimental Algorithmics, Jan. 6, 1997.
Trishul M. Chilimby, et al., "Cache–Conscious Structure Layout", Proceedings of the ACM Sigplan '99 Conference on Programming Language Design and Implementation, May 1999.
Shai Rubin, et al., "Virtual Cache Line: A New Technique to Improve Cache Exploitation for Recursive Data Structures", IBM Research Lab, Haifa, Israel. 1998.
Torbjorn Granlund, et al., "Division by Invariant Integers Using Multiplication", ACM Sigplan 94–6/94. Orlando, Florida, USA. 1994, Pp. 61–72.
Anthony Lamarca, et al., "The Influence of Caches on the Performance of Sorting", Proceedings of the Eighth Annual ACM–SIAM Symposium on Discrete Algorithms, pp. 370–379. 1997.
Richard E. Ladner, et al., "Cache Performance Analysis of Traversals and Random Accesses", Tenth Annual ACM–SIAM Symposium on Discrete Algorithms, 1999.
"Introduction to Algorithms", Cormen, Leiserson and Rivest, 1990, Pp. 94–95, 140–141, 244–245.

* cited by examiner

Primary Examiner—Jack Choules
(74) Attorney, Agent, or Firm—Darby & Darby

(57) ABSTRACT

A technique for improving the performance of binary tree operations involves defining an implicit binary tree structure in a memory array, and clustering of the nodes of the tree in memory in a cache-aware manner. The technique reduces memory latency by improved spatial locality of the binary tree data, and further improves cache performance through reduced size of the data objects resulting from elimination of pointers to other nodes of the tree.

32 Claims, 4 Drawing Sheets

| ARRAY'S INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| NODE VALUE | 15 | 8 | 45 | 4 | | | 12 | | | 22 | | | 70 | | | |

FIG. 6

| ARRAY'S INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| NODE VALUE | 45 | 15 | 70 | 8 | 4 | 12 | 22 | E | | | | | | | | |

TECHNIQUE OF CLUSTERING AND COMPACTION OF BINARY TREES

BACKGROUND OF THE INVENTION

1. Field of the Invention

This invention relates to a technique for efficient storage of recursive data structures in computer memory. More particularly this invention relates to improvements in the arrangement of binary tree elements in a cache computer memory and improved performance of binary tree operations.

2. Description of the Related Art

Figure 1:
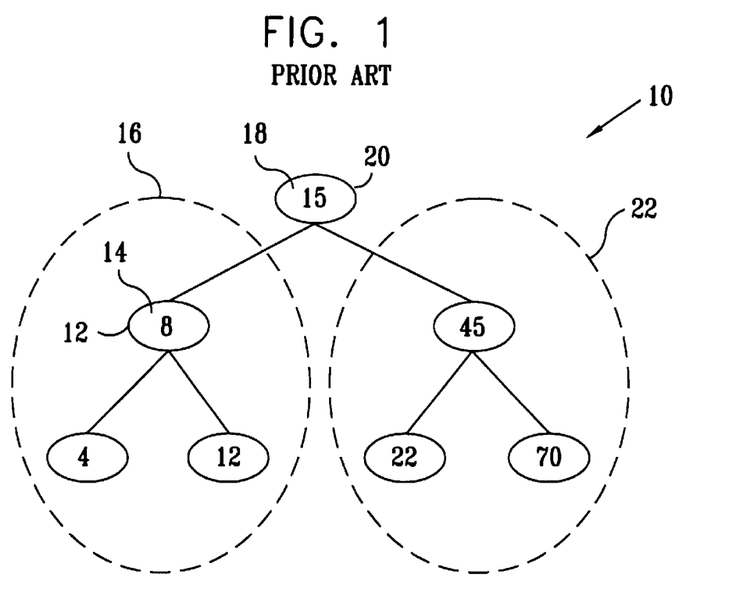
FIG. 1 is a graphical illustration of a binary tree according to the prior art.

Binary trees are widely employed data structures in practical computer applications, as they enable the rapid access of keyed data sets. Search binary trees, an example of which is seen in FIG. 1, are particularly useful for rapid localization of data. A search binary tree 10 satisfies the following conditions:

1. Every node, for example node 12, has a unique key 14.
2. All keys in the left subtree, indicated by the dotted line 16 are smaller than the key 18 in the root 20.
3. All keys in the right subtree, indicated by the dotted line 22, are larger than the key 18 in the root 20.
4. The left and right subtrees are also binary search trees.

Known common operations on binary trees include the insert operation, which inserts a new key into the set, the delete operation, which deletes a key from the set, and the traversal of the tree. The traversal operation outputs the keys in a specific order. Forms of traversal are the inorder traversal, preorder traversal, and postorder traversal. Another important and relevant operation is the membership operation, which checks if a given key belongs to the set.

Frequently a binary tree is a dynamic data structure, in which nodes are allocated during runtime using the heap-allocation mechanism found in languages like C and C++. In its classical implementation, each node of the binary tree contains a key, and two pointers to descendant nodes. Often, two additional pointers are kept in each node: a pointer to the data associated with the key, particularly if the data is large, and a pointer to the ancestor node.

There are two main drawbacks to such an implementation. First, the memory space occupied by the binary tree can considerably exceed the original memory space needed for the data set itself. For example, if the size of each key and pointer is eight bytes, then the size of each node is 24 bytes—three times as large as the original key. It will be evident that eliminating the pointers saves more than 50% of the memory store for the binary tree.

Secondly, as a result of using the heap to allocate and deallocate the nodes, the nodes can become scattered across memory. This is especially true when the user performs a large number of insertions and deletions, because each operation usually allocates or deallocates memory. The result is a functionally inefficient layout, and an increased number of cache misses and page faults during traversals of the binary tree. Analysis of pointer-based algorithms has indicated that as hardware performance has improved over time, cache performance increasingly outweighs instruction count as a determinant of overall performance. This is partly due to an increasing cache-miss penalty in modern machines, compared to older computers, and partly due to a trend of decreasing processor cycle time relative to memory access time. An example of such analysis is found in the paper The Influence of Caches on the Performance of Heaps, LaMarca Anthony, and Ladner, Richard E., The ACM Journal of Experimental Algorithmics, Jan. 6, 1997.

In dynamic binary trees, gaps between nodes in memory layout can be exploited during insertions and deletions. Improved performance in these dynamic operations tends to offset slow tree traversal due to increased memory latency. However in search trees in which insertion and deletions are uncommon, there is no offsetting benefit, and poor spatial locality of data in memory is especially undesirable.

Prior art approaches to improving global performance of algorithms having poorly localized data layout have involved reorganizing the computation while leaving the data layout intact. This is difficult, and in practice not too effective in the case of recursive data structures such as binary trees.

Hardware optimizations such as prefetching have resulted in better performance, however they have not afforded a completely satisfactory solution.

Another alternative to reducing cache misses is to maintain the entire binary tree in the cache during the program lifetime. Cache misses would only occur the first time the tree is accessed. Generally, however, this is not practical. If the tree is large, it will not fit into the cache. Furthermore the availability of the cache to other processes would be reduced, which might decrease the performance of the program itself, and generally degrade the performance of other processes executing on the computer.

SUMMARY OF THE INVENTION

It is therefore a primary object of some aspects of the present invention to improve the performance of computer algorithms involving pointer-based data structures.

It is another object of some aspects of the present invention to speed up binary tree traversals.

It is a further object of some aspects of the present invention to improve the performance of cache memory by increasing spatial locality in memory of recursive data structures.

It is still another object of some aspects of the present invention to decrease the memory space required by recursive data structures.

These and other objects of the present invention are attained by arranging a tree structure in a memory by the steps of: defining a tree data structure, wherein a parent node in the tree has a predetermined number of child nodes; defining an indexed array of data elements for storage thereof in a memory, wherein each element of the array holds a node of the tree; associating a parent node of the tree with a first index of the array, and associating each child node of the parent node with second indices of the array, wherein predefined individual functional relationships exist between the first index and each of the second indices; and mapping the nodes indexed by the first index and by the second indices to a predefined area of a memory which can be efficiently accessed. The arrangement is such that each node of the tree is assigned a unique position or index inside the array. From the functional arrangements existing therebetween, and given the position of any node it is easy to calculate the position of a parent or a child node. In some preferred embodiments of the invention, triplet-tiles formed by a parent and its children are positioned consecutively in the array.

According to an aspect of the invention the memory is a cache memory, and the predefined area of the memory is a cache line.

According to another aspect of the invention the predefined area of the memory is a page.

According to yet another aspect of the invention the tree is traversed by accessing one of the nodes in the predefined area of the memory according to the index associated therewith, calculating an index of a parent node or a child node of the accessed node according to the functional relationship therebetween, and then accessing the node that is associated with the calculated index.

The invention provides a method of arranging a binary tree structure in a memory, which is performed by: defining a binary tree data structure which has a plurality of nodes, including at least a parent node, a first child node and a second child node; and defining an indexed array of data elements for storage thereof in a memory, wherein each data element holds a node of the tree; associating a parent node of the tree with a first index of the array; associating a first child node of the parent node with a second index of the array; and associating a second child node of the parent node with a third index of the array. Predefined functional relationships exist between the first index and the second index, and between the first index and the third index. The nodes associated with the first index, the second index and the third index are mapped to a predefined area of a memory which can be efficiently accessed. The predefined area may be a cache line or a memory page.

Preferably the first index has a value j and the predefined functional relationships are: in a first event that the value j modulo three has a value zero, then the second index has a value j+1 and the third index has a value j+2; in a second event that the value j modulo 3 has a value one, then the second index has a value 4j−1 and the third index has a value 4j+2; and in a third event that the value j modulo 3 has a value two, then the second index has a value 4j+1 and the third index has a value 4j+4.

The invention provides a computer software product, which is a computer-readable medium in which computer program instructions are stored, which instructions, when read by a computer, cause the computer to arrange a tree structure in a memory, by executing the steps of: defining a tree data structure, wherein a parent node in the tree has a predetermined number of child nodes; defining an indexed array of data elements for storage thereof in a memory, wherein each element of the array holds a node of the tree; associating a parent node of the tree with a first index of the array; and associating each child node of the parent node with second indices of the array, wherein predefined individual functional relationships exist between the first index and each of the second indices; and mapping the nodes indexed by the first index and by the second indices to a predefined area of a memory which can be efficiently accessed.

According to an aspect of the invention the memory is a cache memory, and the predefined area memory is a cache line.

According to another aspect of the invention the predefined area of the memory is a page.

According to yet another aspect of the invention the computer program instructions further cause the computer to traverse the tree by executing the steps of: accessing one of the nodes in the predefined area of the memory according to the index associated therewith; calculating an index of a parent node or a child node of the accessed node according to the functional relationship therebetween; and then accessing the node that is associated with the calculated index.

The invention provides a computer software product, which is a computer-readable medium in which computer program instructions are stored, which instructions, when read by a computer, cause the computer to arrange a binary tree structure in a memory by executing the steps of: defining a binary tree data structure having a plurality of data elements, wherein the tree data structure has a parent node, a first child node and a second child node; defining an indexed array of data elements for storage thereof in a memory, wherein each the element represents a node of the tree; associating the parent node of the tree with a first index of the array; associating the first child node of the parent node with a second index of the array; and associating the second child node of the parent node with a third index of the array, wherein predefined individual functional relationships exist between the first index and each of the second indices and third indices. The nodes associated with the first index, the second index and the third index are mapped to a predefined area of a memory which can be efficiently accessed.

According to an aspect of the invention, the memory is a cache memory, and the predefined area memory is a cache line.

According to a further aspect of the invention the predefined area of the memory is a page.

Preferably the first index has a value j and the predefined functional relationships are: in a first event that the value j modulo three has a value zero, then the second index is a value j+1 and the third index has a value j+2; in a second event that the value j modulo 3 has a value one, then the second index has a value 4j−1 and the third index has a value 4j+2; and in a third event that the value j modulo 3 has a value two, then the second index has a value 4j+1 and the third index has a value 4j+4.

The invention provides a data retrieval system, including a computer in which computer program instructions are stored, which instructions cause the computer to arrange a binary tree structure in a memory by executing the steps of: defining a binary tree data structure having a plurality of data elements, wherein the tree data structure has a parent node, a first child node and a second child node; defining an indexed array of data elements for storage thereof in a memory, wherein each the element represents a node of the tree; associating the parent node of the tree with a first index of the array; associating the first child node of the parent node with a second index of the array; and associating the second child node of the parent node with a third index of the array, wherein predefined individual functional relationships exist between the first index and each of the second indices and third indices. The nodes associated with the first index, the second index and the third index are mapped to a predefined area of a memory which can be efficiently accessed.

According to an aspect of the invention the memory is a cache memory, and the predefined area memory is a cache line.

According to another aspect of the invention the predefined area of the memory is a page.

According to yet another aspect of the invention the first index has a value j and the predefined functional relationships are: in a first event that the value j modulo three has a value zero, then the second index is a value j+1 and the third index has a value j+2; in a second event that the value j modulo 3 has a value one, then the second index has a value 4j−1 and the third index has a value 4j+2; and in a third event that the value j modulo 3 has a value two, then the second index has a value 4j+1 and the third index has a value 4j+4.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Figure 2:
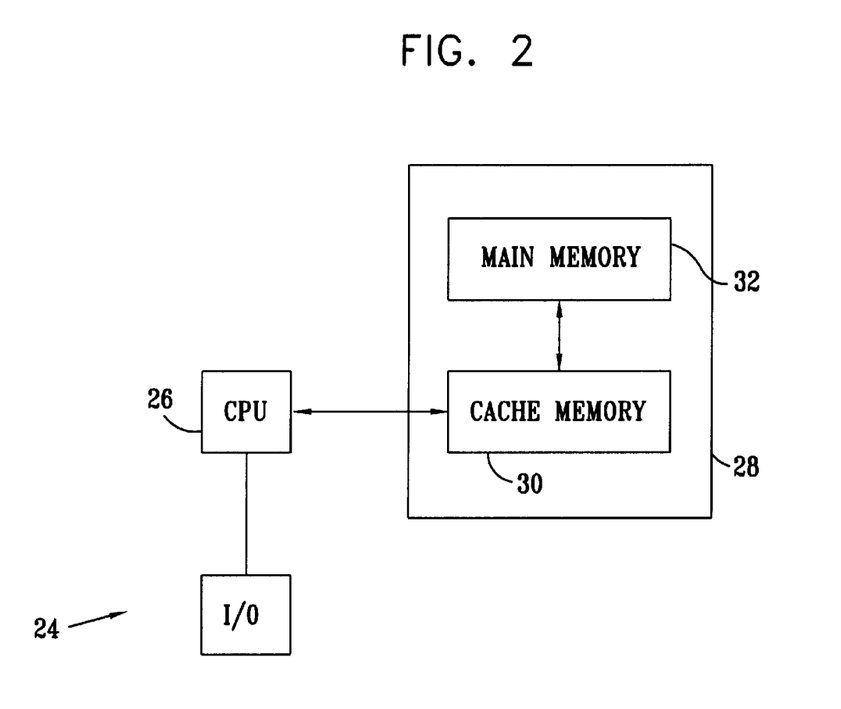
FIG. 2 is a block diagram of a computer system having a hierarchical memory suitable for operations in accordance with the invention on a binary tree.

Turning now to the drawings, and more particularly to FIG. 2 thereof, there is schematically shown a computer system 24, comprising a central processing unit 26, which operates on data stored in a hierarchical memory 28, which includes a relatively small cache memory 30 and a larger main memory 32. The cache memory 30 is directly connected to the central processing unit 26, and has a short access time. As is known in the art, the cache memory 30 can itself be comprised of a plurality of hierarchical memories. While the embodiment herein is disclosed with reference to a cache memory, the invention can be practiced with other memory structures, such as paged memories.

The computer system 24 executes programs which operate on binary tree data structures, as will be disclosed in more detail hereinbelow. In general the binary trees are too large to be stored in the cache memory 30, but can be accommodated in the main memory 32. Those portions of the data structure immediately required by the central processing unit 26 are loaded from the cache memory 30 if available therein. Otherwise the data is first loaded into the cache memory 30 from the main memory 32 in accordance with the memory management policy of the computer system 24. As the access time of the main memory 32 is long, it will be evident that the system performance will be improved if the required data can be found in the cache memory 30.

Figure 3:
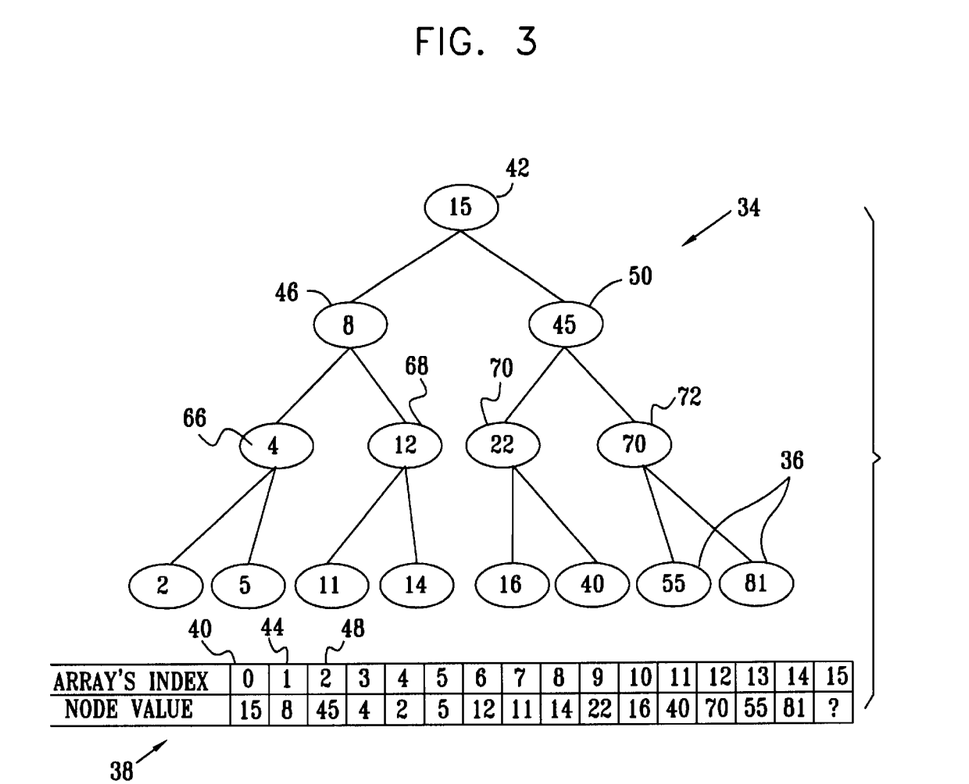
FIG. 3 illustrates an arrangement according to an aspect of the invention for storing a binary tree in an array.

According to one aspect of the invention memory space required by the pointers of a binary tree is reduced by compaction. Referring now to FIG. 3, which illustrates a binary tree 34, the memory space required to store the nodes 36 is reduced by the use of an array, represented by table 38, instead of storing pointers in the nodes of the tree. Pointer storage is eliminated by associating an index of the array with each node. The value of the index of each child node has a known relationship to the index of its parent node. In FIG. 3 the index 40 in which data representing the root node 42 has a value 0, as shown in the corresponding position in bottom row of the table 38, which holds the value of the key of the root node 42. Similarly, the index 44, corresponding to the data of the left child node 46 has the known value 1, and the index 48 of the right child node 50 has the known value 2. In the embodiment of FIG. 3, the arrangement for positioning the child nodes in the array with respect to their parent is as follows.

Let j be the index of a node in the array and denote by j% 3 the remainder of j divided by 3, where "%" is the arithmetic modulo operator. Instead of positioning the two children of node in the array cells 2j, 2j+1, as in the conventional compaction strategy, the following positioning scheme is used:

If j% 3 equals 0 then the indices of the left and right child nodes are placed respectively in positions j+1 and j+2;

if j% 3 equals 1 then the indices of the left and right child nodes are respectively 4j−1 and 4j−2; and if j% 3 equals 2 then the indices of the left and right child nodes are respectively 4j+1 and 4j+4.

As a consequence of this positioning scheme it follows that if j is the index of a node, then the index of the node's parent is calculated as follows:

If j% 3 equals 2 then the index of the parent is j−2;

if j% 3 equals 1 then the index of the parent is j−1;

if j% 3 equals 0 and j% 4 equals 3 then the index of the parent is (j+1)/4; and if j% 3 equals 0 and j% 4 does not equal 3 then the index of the parent is (j−1)/4

In the preferred embodiment of the invention, each node can be regarded as belonging to exactly one triplet, and the binary tree is "tiled" by these triplets. In the arrangement outlined above, the proximity of the indices that are related to the elements of a triplet implies a tendency for the elements to reside inside the same cache line in practical cache implementations.

Figure 4:
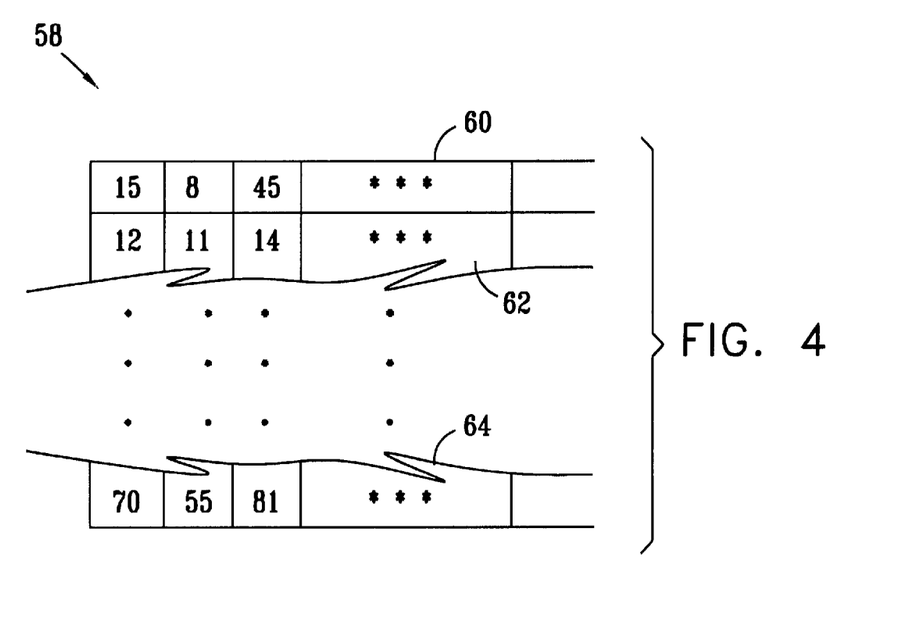
FIG. 4 illustrates cache memory having data stored therein in accordance with the invention.

This positioning arrangement of the nodes in the array reduces the number of cache misses during tree operations. A representation of a cache memory 58 is shown in FIG. 4, wherein the memory is organized into a plurality of cache lines 60, 62, and 64. Data of the triplet defined by the dotted line 52 are clustered on cache line 60. Similarly the data of the triplets defined by the dotted line 54 and the dotted line 56 are respectively placed on the cache line 62 and the cache line 64. It can be seen that a traversal of the binary tree 34 can only incur a cache miss when moving from one triplet to another, and in many cases there will be a cache hit, even when accessing different triplets.

The combination of eliminating pointers from the implementation of the binary tree 34 together with the cache-aware layout of the nodes of the tree, as seen in FIG. 4, greatly enhances both main memory and cache utilization.

In the discussion above it was assumed that each cache line contains three nodes of the binary tree. In computers using commonly available processors, such as the PowerPC® 604, or the Pentium®, this size can hold 4 integers in most implementations. However, there are systems with longer cache lines, e.g. 128 bytes, and even 256 bytes. In these systems it is useful to create larger groups of tree nodes. The technique used for grouping nodes in groups of size 3 can be used in general to group $2^i-1$ nodes in a group. The case where i is 2 has been described above as a particular preferred embodiment. The strategy of cache-aware grouping of the nodes has the potential to reduce the number of cache misses by a factor of (i−1)/i, at the price of having at most the last i levels partially filled.

While the compaction scheme disclosed above requires more computation than the simpler known compaction schemes, this can be mitigated by the use of several optimization techniques in a practical implementation.

The relatively expensive operation of calculating j% 3 can be avoided by observing that when j% 3 is zero, for example at the root node of a triplet, then, for the left child node, j% 3 will always be one. In the case of the right child node j% 3 will always be 2. Moving to another triplet resets j% 3 back to zero. Simply keeping track of the current position with respect to the root node of the current triplet provides a rapid, computationally inexpensive method of evaluating j% 3.

Referring again to FIG. 3, a technique of calculating the position of grandchildren nodes without incurring the penalty of a branch in the calculation routine is now explained. If one is searching the binary tree 34 in a direction from the root downward toward a leaf, assume that the traversal involves a move from the root node 42, having an index i, where i% 3 is 0, to a child node having an index i+d, where d is 1 (left child node 46) or d is 2 (right child node 50). The positions of the grandchildren nodes of the root node 42 in the array can be calculated as follows:

Let j=i+d. Then the child nodes of j have positions in the case that d equals 1:

$$4j-1=4i+3, \text{ and}$$

$$4j+2=4i+6;$$

and in the case that d is 2

$$4j+1=4i+9 \text{ and}$$

$$4j+4=4i+12$$

Noting that if d is 1, then (d<<d) is 2, and if d is 2, then (d<<d) is 8, where "<<" is the "shift-left" operator applied to integer data. It will be evident that the grandchildren of the root node 42, which are the two children of the node at position i+d nodes 66, 68 (if d=1), and nodes 70, 72 (if d=2), are positioned at $$4i+(d<<d)+1 \text{ and}$$

$$4i+(d<<d)+4.$$

Use of the left shift operator avoids the computational penalty of program branches which would normally occur when implementing the "if statements" set forth above in the discussion of locating child nodes.

In the calculation of the position of a parent node, division by a constant is required. If the constant is a power of 2, as in the preferred embodiment discussed above, then the division can be done efficiently using a "shift-right" operation, as is known in the art of integer arithmetic. However, even if this constant is not a power of two, there are known "strength-reduction" optimizations to convert the division into a multiplication.

Figure 5:
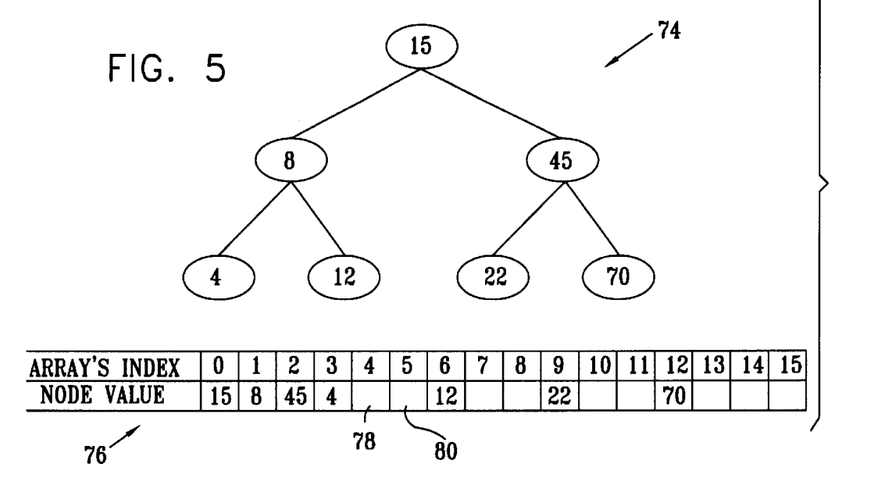
FIG. 5 is another illustration of binary tree storage in an array according to the invention.

As noted above, the placement schemes according to the invention may require excessive storage space even if the tree is totally balanced. Referring now to FIG. 5, binary tree 74 is stored in an array which is represented by table 76 using the scheme described above with respect to FIG. 3. However the binary tree 74 has a smaller height than the binary tree 34 (FIG. 3), and now the array shown in table 76 is sparse. For example the cells 78, 80 having indices 4 and 5 of the array respectively are not utilized for storage of the nodes of the binary tree 74.

There are several ways in which the amount of wasted storage space can be reduced. For instance, if h is the height of the tree and g is the height of the node-groups used, it is possible to store the f=(h mod g) levels of the tree in another structure and use the placement scheme disclosed above for storing each of the remaining $2^f$ subtrees separately without any wasted space, assuming the tree is totally balanced. This solution incurs the cost of manipulating several linked structures instead of one. Thus in the example of FIG. 5 (h=3, g=2, f=1), the root can be stored separately from the tree, and each of the two subtrees rooted at the children of the root can be stored using the arrangement according to the embodiment disclosed above without wasted space.

Figure 6:
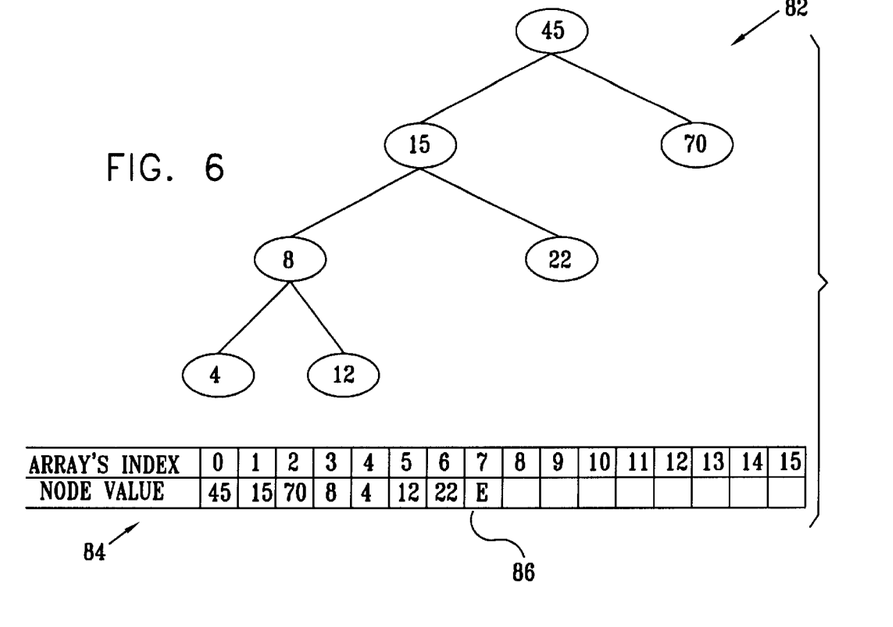
FIG. 6 illustrates a balanced binary tree stored in an array according to the invention.

Another technique of reducing storage is to balance the tree such that all node-groups are full, except possibly the "last" group, as is seen in FIG. 6, which illustrates a binary tree 82 having such a balanced configuration. The compaction of the array is evident from inspection of table 84, in which the leftmost 7 cells are completely filled, the cell 86 is empty, and the rightmost 8 cells are available for other uses.

These techniques are examples of possible techniques for reducing memory requirements for array storage when the technique according to the invention is used. Other techniques could also be used, each presenting its particular space—time tradeoff.

Those skilled in the art will appreciate that implementation of the preferred embodiment herein described can readily be accomplished with many available programming languages, suitable for the manipulation of binary tree structures. Binary trees appear in many commercial applications, and the invention will find ready applicability in class libraries, compilers, and database applications.

A technique for improving the performance of binary tree operations has been presented herein, which advantageously exploits the techniques of compaction and clustering in a combination which can be readily implemented. Cache performance increases by a factor of at least 2 during runtime, at the cost of slightly more complex computation.

While this invention has been explained with reference to the structure disclosed herein, it is not confined to the details set forth and this application is intended to cover any modifications and changes as may come within the scope of the following claims:

What is claimed is:

1. A method of arranging a tree structure in a memory, comprising the steps of:
    defining a tree data structure, wherein a parent node in said tree has a predetermined number of child nodes;
    defining an indexed array of data elements for storage thereof in a memory, wherein each said element represents a node of said tree;
    associating said parent node of said tree with a first index of said array, and associating each said child node of said parent node with second indices of said array, wherein predefined individual functional relationships exist between said first index and each of said second indices;
    mapping the nodes indexed by said first index and by said second indices to a predefined area of a memory; and
    determining a third index of any grandchild node of said parent node in said array using no more than one arithmetic expression comprising a constant linear coefficient of said first index.

2. The method according to claim 1, wherein said memory is a cache memory, and said predefined area of a memory is a cache line.

3. The method according to claim 1, wherein said predefined area of said memory is a page.

4. The method according to claim 1, further comprising the step of traversing said tree by the steps of:

accessing one of said nodes in said predefined area of said memory according to the index associated therewith;

calculating an index of a parent node or a child node of said one node according to a said functional relationship therebetween; and accessing the node that is associated with said calculated index.

5. The method according to claim 1, wherein said parent node and said child nodes are associated with consecutive indices of said indexed array.

6. The method according to claim 1, wherein said arithmetic expression is 4i+(d<<d)+1 or 4i+(d<<d)+4; wherein i is said first index of said parent node, d=1 for a first genealogy comprising a first child node, and d=2 for a second genealogy comprising a second child node, and << represents a left shift operator.

7. A method of arranging a binary tree structure in a memory, comprising the steps of:

defining a binary tree data structure comprising a plurality of nodes, comprising a parent node, a first child node and a second child node;

defining an indexed array of data elements for storage thereof in a memory, wherein each said element represents a said node of said tree;

associating said parent node of said tree with a first index of said array, associating said first child node of said parent node with a second index of said array, and associating said second child node of said parent node with a third index of said array, wherein predefined functional relationships exist between said first index and said second index and between said first index and said third index;

mapping the nodes associated with said first index, said second index and said third index to a predefined area of a memory; and determining a fourth index of any grandchild node of said parent node in said array using no more than one arithmetic expression comprising a constant linear coefficient of said first index.

8. The method according to claim 7, wherein said memory is a cache memory, and said predefined area memory is a cache line.

9. The method according to claim 7, wherein said predefined area of said memory is a page.

10. The method according to claim 7, wherein said parent node and said first and second child nodes are associated with consecutive indices of said indexed array.

11. The method according to claim 7, wherein said arithmetic expression is 4i+(*d*<<*d*)+1 or 4i+(*d*<<*d*)+4; wherein i is said first index of said parent node, d=1 for a first genealogy comprising said first child node, and d=2 for a second genealogy comprising said second child node, and << represents a left shift operator.

12. A method of arranging a binary tree structure in a memory, comprising the steps of:

defining a binary tree data structure comprising a plurality of nodes, comprising a parent node, a first child node and a second child node;

defining an indexed array of data elements for storage thereof in a memory, wherein each said element represents a said node of said tree;

associating said parent node of said tree with a first index of said array, associating said first child node of said parent node with a second index of said array, and associating said second child node of said parent node with a third index of said array, wherein predefined functional relationships exist between said first index and said second index and between said first index and said third index; and mapping the nodes associated with said first index, said second index and said third index to a predefined area of a memory;

wherein said first index has a value j and said predefined functional relationships are:

in a first event that said value j modulo three has a value zero, then said second index has a value j+1 and said third index has a value j+2;

in a second event that said value j modulo 3 has a value one, then said second index has a value 4j−1 and said third index has a value 4j+2; and in a third event that said value j modulo 3 has a value two, then said second index has a value 4j+1 and said third index has a value 4j+4.

13. A computer software product, comprising a computer-readable medium in which computer program instructions are stored, which instructions, when read by a computer, cause the computer to arrange a tree structure in a memory, by executing the steps of:

defining a tree data structure having a plurality of data elements, wherein a parent node in said tree has a predetermined number of child nodes;

defining an indexed array of data elements for storage thereof in a memory, wherein each said element represents a node of said tree;

associating said parent node of said tree with a first index of said array, and associating each said child node of said parent node with second indices of said array, wherein predefined functional relationships exist between said first index and each of said second indices;

mapping the nodes indexed by said first index and by said second indices to a predefined area of a memory; and determining a third index of any grandchild node of said parent node in said array using no more than one arithmetic expression comprising a constant linear coefficient of said first index.

14. The computer software product according to claim 13, wherein said memory is a cache memory, and said predefined area memory is a cache line.

15. The computer software product according to claim 13, wherein said predefined area of said memory is a page.

16. The computer software product according to claim 13, wherein said computer program instructions further cause the computer to traverse said tree by executing the steps of:

accessing one of said nodes in said predefined area of said memory according to the index associated therewith;

calculating an index of a parent node or a child node of said one node according to a said functional relationship therebetween; and accessing the node that is associated with said calculated index.

17. The computer software product according to claim 13, wherein said parent node and said child nodes are associated with consecutive indices of said indexed array.

18. The computer software product according to claim 13, wherein said arithmetic expression is 4i+(*d*<<*d*)+1 or 4i+(*d*<<*d*)+4; wherein i is said first index of said parent node, d=1 for a first genealogy comprising a first child node, and d=2 for a second genealogy comprising a second child node, and << represents a left shift operator.

19. A computer software product, comprising a computer-readable medium in which computer program instructions are stored, which instructions, when read by a computer, cause the computer to arrange a binary tree structure in a memory by executing the steps of:

defining a binary tree data structure having a plurality of data elements, said tree data structure comprising a parent node, a first child node and a second child node;

defining an indexed array of data elements for storage thereof in a memory, wherein each said element represents a said node of said tree;

associating said parent node of said tree with a first index of said array, associating said first child node of said parent node with a second index of said array, and associating said second child node of said parent node with a third index of said array, wherein predefined functional relationships exist between said first index and each of said second indices and third indices;

mapping the nodes associated with said first index, said second index and said third index to a predefined area of a memory; and determining a fourth index of any grandchild node of said parent node in said array using no more than one arithmetic expression comprising a constant linear coefficient of said first index.

20. The computer software product according to claim 19, wherein said memory is a cache memory, and said predefined area of said memory is a cache line.

21. The computer software product according to claim 19, wherein said predefined area of said memory is a page.

22. The computer software product according to claim 19, wherein said computer program instructions further cause the computer to traverse said tree by executing the steps of:

accessing one of said nodes in said predefined area of said memory according to the index associated therewith;

calculating an index of a parent node or a child node of said one node according to a said functional relationship therebetween; and accessing the node that is associated with said calculated index.

23. The computer software product according to claim 19, wherein said parent node and said child nodes are associated with consecutive indices of said indexed array.

24. The computer software product according to claim 19, wherein said arithmetic expression is $4i+(d<<d)+1$ or $4i+(d<<d)+4$; wherein i is said first index of said parent node, d=1 for a first genealogy comprising said first child node, and d=2 for a second genealogy comprising said second child node, and << represents a left shift operator.

25. A computer software product, comprising a computer-readable medium in which computer program instructions are stored, which instructions, when read by a computer, cause the computer to arrange a binary tree structure in a memory by executing the steps of:

defining a binary tree data structure having a plurality of data elements, said tree data structure comprising a parent node, a first child node and a second child node;

defining an indexed array of data elements for storage thereof in a memory, wherein each said element represents a said node of said tree;

associating said parent node of said tree with a first index of said array, associating said first child node of said parent node with a second index of said array, and associating said second child node of said parent node with a third index of said array, wherein predefined functional relationships exist between said first index and each of said second indices and third indices; and mapping the nodes associated with said first index, said second index and said third index to a predefined area of a memory;

wherein said first index has a value j and said predefined functional relationships are:

in a first event that said value j modulo three has a value zero, then said second index has a value j+1 and said third index has a value j+2;

in a second event that said value j modulo 3 has a value one, then said second index has a value 4j−1 and said third index has a value 4j+2; and in a third event that said value j modulo 3 has a value two, then said second index has a value 4j+1 and said third index has a value 4j+4.

26. A data retrieval system, comprising:

a computer in which computer program instructions are stored, which instructions cause said computer to arrange a binary tree structure in a memory by executing the steps of:

defining a binary tree data structure having a plurality of data elements, said tree data structure comprising a parent node, a first child node and a second child node;

defining an indexed array of data elements for storage thereof in a memory, wherein each said element represents a said node of said tree;

associating said parent node of said tree with a first index of said array, associating said first child node of said parent node with a second index of said array, and associating said second child node of said parent node with a third index of said array, wherein predefined functional relationships exist between said first index and each of said second indices and third indices;

mapping the nodes associated with said first index, said second index and said third index to a predefined area of a memory; and determining a fourth index of any grandchild node of said parent node in said array using no more than one arithmetic expression comprising a constant linear coefficient of said first index.

27. The data retrieval system according to claim 26, wherein said memory is a cache memory, and said predefined area of said memory is a cache line.

28. The data retrieval system according to claim 26, wherein said predefined area of said memory is a page.

29. The data retrieval system according to claim 26, wherein said computer program instructions further cause the computer to traverse said tree by executing the steps of:

accessing one of said nodes in said predefined area of said memory according to the index associated therewith;

calculating an index of a parent node or a child node of said one node according to a said functional relationship therebetween; and accessing the node that is associated with said calculated index.

30. The data retrieval system according to claim 26, wherein said parent node and said child nodes are associated with consecutive indices of said indexed array.

31. The data retrieval system according to claim 26, wherein said arithmetic expression is $4i+(d<<d)+1$ or $4i+(d<<d)+4$; wherein i is said first index of said parent node, d=1 for a first genealogy comprising said first child node, and d=2 for a second genealogy comprising said second child node, and << represents a left shift operator.

32. A data retrieval system, comprising:
- a computer in which computer program instructions are stored, which instructions cause said computer to arrange a binary tree structure in a memory by executing the steps of:
    - defining a binary tree data structure having a plurality of data elements, said tree data structure comprising a parent node, a first child node and a second child node;
    - defining an indexed array of data elements for storage thereof in a memory, wherein each said element represents a said node of said tree;
    - associating said parent node of said tree with a first index of said array, associating said first child node of said parent node with a second index of said array, and associating said second child node of said parent node with a third index of said array, wherein predefined functional relationships exist between said first index and each of said second indices and third indices; and
    - mapping the nodes associated with said first index, said second index and said third index to a predefined area of a memory;
- wherein said first index has a value j and said predefined functional relationships are:
    - in a first event that said value j modulo three has a value zero, then said second index has a value j+1 and said third index has a value j+2;
    - in a second event that said value j modulo 3 has a value one, then said second index has a value 4j−1 and said third index has a value 4j+2; and
    - in a third event that said value j modulo 3 has a value two, then said second index has a value 4j+1 and said third index has a value 4j+4.

* * * * *